United States Patent [19]

Jentoft et al.

[11] E Patent Number: Re. 32,915

[45] Reissued Date of Patent: May 2, 1989

[54] SKYLIGHT CONSTRUCTION

[75] Inventors: Arthur P. Jentoft, Kennebunkport; Paul A. Couture, Emery Mills, both of Me.

[73] Assignee: Wasco Products, Inc., Sanford, Me.

[21] Appl. No.: 153,493

[22] Filed: Feb. 3, 1988

Related U.S. Patent Documents

Reissue of:

[64] Patent No.: 4,455,799
Issued: Jun. 26, 1984
Appl. No.: 439,027
Filed: Nov. 4, 1982

U.S. Applications:

[63] Continuation of Ser. No. 879,280, Jun. 25, 1986, abandoned, which is a continuation of Ser. No. 148,974, May 12, 1980, abandoned, which is a continuation of Ser. No. 923,245, Jul. 10, 1978, abandoned.

[51] Int. Cl.[4] ..... E04B 7/18
[52] U.S. Cl. ..... 52/200
[58] Field of Search ..... 52/200

[56] References Cited

U.S. PATENT DOCUMENTS

| | | | |
|---|---|---|---|
| 3,034,260 | 5/1962 | Wasserman | 52/200 X |
| 3,111,786 | 11/1963 | Wasserman | 52/200 X |
| 3,393,471 | 7/1968 | Skowlund et al. | 49/504 X |
| 3,440,779 | 4/1969 | Helma | 52/475 X |
| 3,552,077 | 1/1971 | Hemminger | 52/397 X |
| 3,868,789 | 3/1975 | Gates | 52/309.1 X |
| 4,008,552 | 2/1977 | Biebuyck | 52/397 |
| 4,073,097 | 2/1978 | Jentoff et al. | 52/200 X |
| 4,080,763 | 3/1978 | Naidus et al. | 52/200 |
| 4,193,237 | 3/1980 | Jankowski | 52/200 |

FOREIGN PATENT DOCUMENTS

| | | | |
|---|---|---|---|
| 1202464 | 10/1965 | Fed. Rep. of Germany | 52/200 |

*Primary Examiner*—Carl D. Friedman
*Attorney, Agent, or Firm*—Wolf, Greenfield & Sacks

[57] ABSTRACT

The skylight may be of the domed-type or flat-type and of single or double glass (acrylic or other transparent or translucent plastic) construction. The skylight fits within an opening in a roof or the like and has a peripheral curb of an extruded rigid thermoplastic, such as polyvinylchloride (PVC), which is fixed to the roof construction about the opening. The rigid thermoplastic curb has a top co-extruded flexible thermoplastic (such as PVC) gasket integral with the curb and compressible against the edge of the glass or plastic dome or panel. There is also provided a second flexible integral co-extruded thermoplastic gasket adapted to contact a retainer secured to the curb for retaining the dome or panel on the curb. The rigid curb is of a thermoplastic in the shore "D" durometer hardness scale, while the flexible gaskets are of a thermoplastic in the shore "A" durometer hardness scale. A heat platten welding technique, which would most commonly be used in welding the curb frame mitres, would also weld the gaskets simultaneously for a continuous seal. Other less commonly used thermoplastic welding techniques, such as ultrasonic, hot gas, high frequency and friction, could be employed to accomplish the simultaneous bond at the corners.

37 Claims, 2 Drawing Sheets

Fig. 4
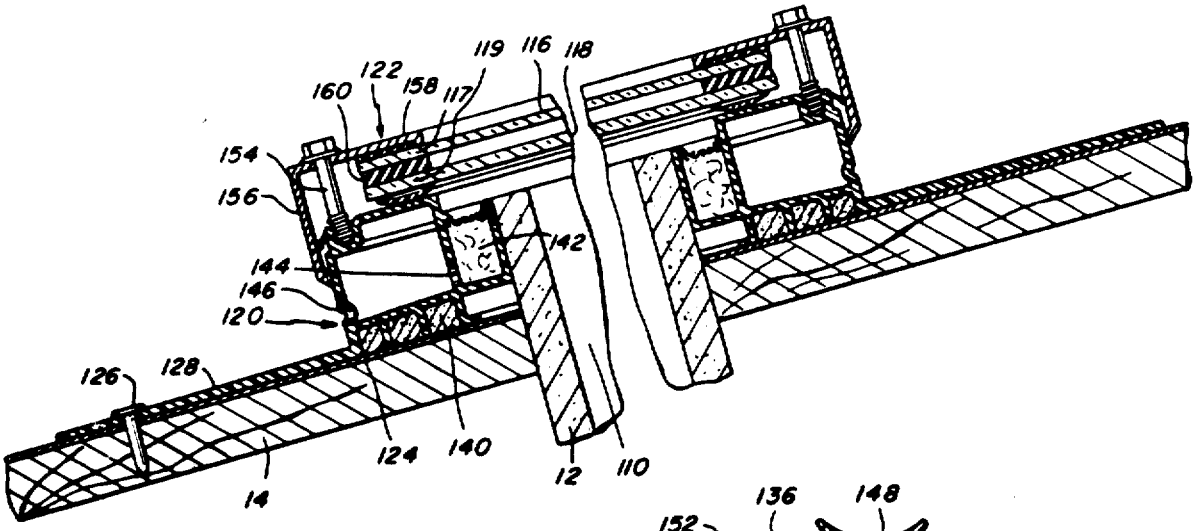
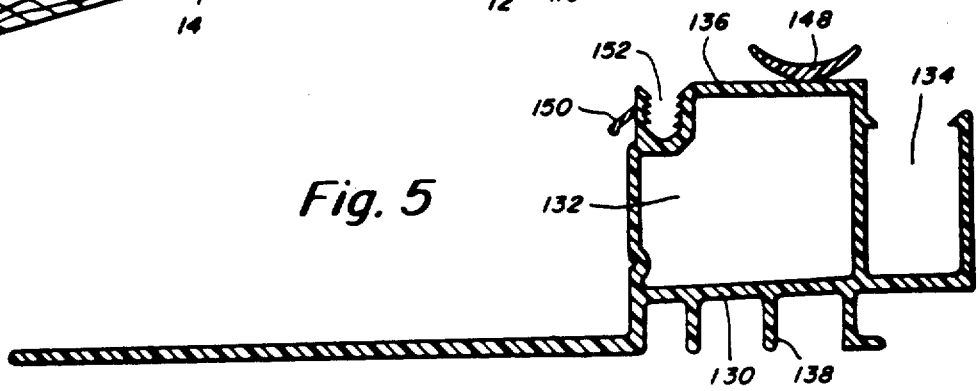
Fig. 5
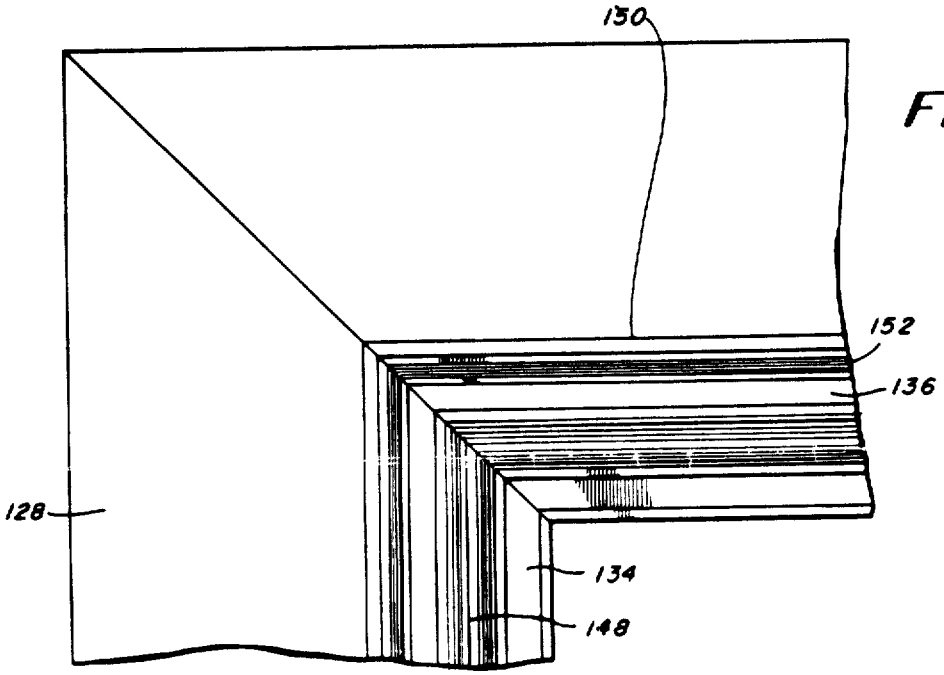
Fig. 6

SKYLIGHT CONSTRUCTION

Matter enclosed in heavy brackets [ ] appears in the original patent but forms no part of this reissue specification; matter printed in italics indicates the additions made by reissue.

*This application is a continuation, of application Ser. No. 879,280, filed June 25, 1986, abandoned.* This application is a continuation of application Ser. No. 148,974, filed May 12, 1980, *abandoned* which in turn is a continuation of Ser. No. 923,245 filed July 10, 1978, *abandoned.*

BACKGROUND OF THE INVENTION

The present invention relates in general to an improved skylight construction, and is concerned, more particularly, with an improved curb frame construction which provides an improved thermalized skylight which is preferably for residential use.

The typical prior art skylight curb frame is made of a metal material such as an extruded aluminum. See for example, U.S. Pat. No. 4,073,097. These curb frames certainly provide an adequate support, however, they permit heat conduction therethrough either from the inside of the building to the outside or vice versa. Furthermore, in cold weather there is a tendency for condensation to form on the glass panels or acrylic dome because of an insufficient temperature differential between the inside and outside of the panels or domes.

Accordingly, one object of the present invention is to provide an improved skylight construction having, in particular, an improved curb frame construction.

Another object of the present invention is to provide an improved thermalized skylight preferably for residential use.

A further object of the present invention is to provide an improved skylight construction wherein the curb frame may be constructed of a relatively rigid thermoplastic material such as polyvinylchloride.

Still another object of the present invention is to provide an improved skylight curb frame construction combining a curb of a rigid thermoplastic in combination with a flexible thermoplastic forming one or more gaskets for sealing the curb frame to at least the dome or panel associated therewith.

Still another object of the present invention is to provide an improved method of construction of a skylight incorporating composite integral rigid and flexible thermoplastic sections and incorporating a welding technique adapted to weld both the curb and the gasket to provide a continuous seal.

The forming of a positive seal is important with regard to skylight construction. Air exfiltration out of a skylight due to the suction pressures caused by winds is an important factor in the total energy effect on a building when a skylight is used. Thus, the use of this special composite PVC is important from the standpoint of energy conservation.

Accordingly, another object of the present invention is to provide a skylight construction that is characterized by being energy-saving.

SUMMARY OF THE INVENTION

To accomplish the foregoing and other objects of the invention, there is provided a skylight construction adapted to be fitted into an opening in a building such as the roof of a residential house. This skylight construction comprises a curb frame extending about the opening and having means for receiving nails or the like for securing the frame in place about the opening. In one embodiment, one, two or more transparent or translucent thermoplastic domes cover the opening and extend at the edge to the curb frame. In another embodiment the dome is replaced by one, two or more glass panels. A retainer extends about the periphery of the skylight for holding the dome or panel on the curb frame. In accordance with the invention the curb frame is constructed of a rigid plastic, preferably polyvinylchloride (PVC). The PVC curb frame is heat welded at the corners of the frame and has integral therewith at least one gasket formed of a flexible portion of PVC or the like for sealing between the curb frame and the covering means over the opening. The curb frame is constructed preferably of a rigid PVC having a hardness in the shore scale "D", while the gasket is of a flexible PVC having a hardness in the shore hardness range "A". One important feature of the present invention is that a heat platten, high frequency, ultrasonic or other thermoplastic welding technique may be used to weld the curb, and also at the same time weld the gasket for a continuous seal. This provides an extremely tight skylight construction which is an energy-saving feature of the invention. The curb frame preferably also includes a second gasket that is flexible, integral with the curb frame and contacts the retaining means to form a seal therewith. The curb frame may have a hollow construction, preferably has weep holes holes therein, and includes means on the inner side thereof defining a condensation gutter.

BRIEF DESCRIPTION OF THE DRAWINGS

Numerous other objects, features and advantages of the invention should now become apparent upon a reading of the following detailed description taken in conjunction with the accompanying drawings, in which:

FIG. 4 is a cross-sectional view similar to the view of FIG. 1 but for an alternate embodiment of a flat skylight construction;

FIG. 5 shows in cross-section, the detail of the curb frame of FIG. 4;

FIG. 6 is a plan view showing a fragment of the skylight construction of FIG. 4.

DETAILED DESCRIPTION

Figure 1:
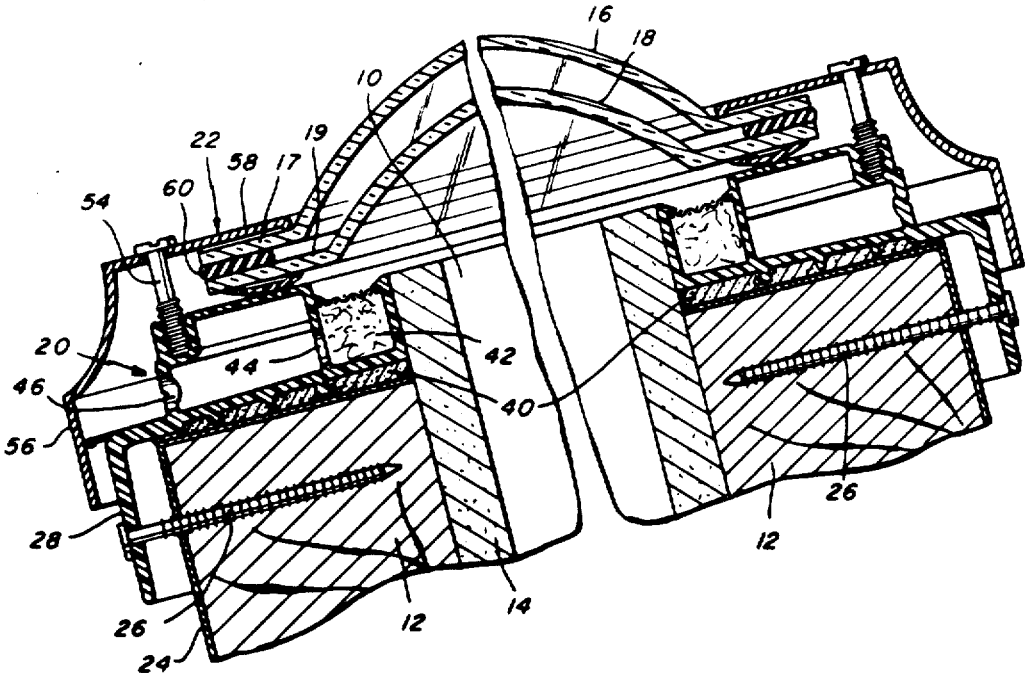
FIG. 1 is a cross-sectional view of a domed skylight construction showing only a portion of the pair of domes that are used.
Figure 2:
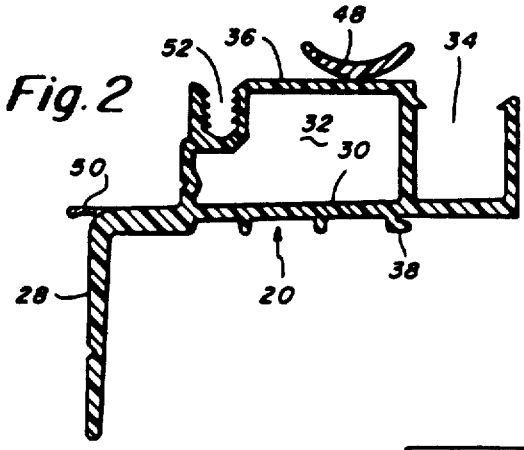
FIG. 2 is a somewhat enlarged view of the curb frame construction depicted in FIG. 1.
Figure 3:
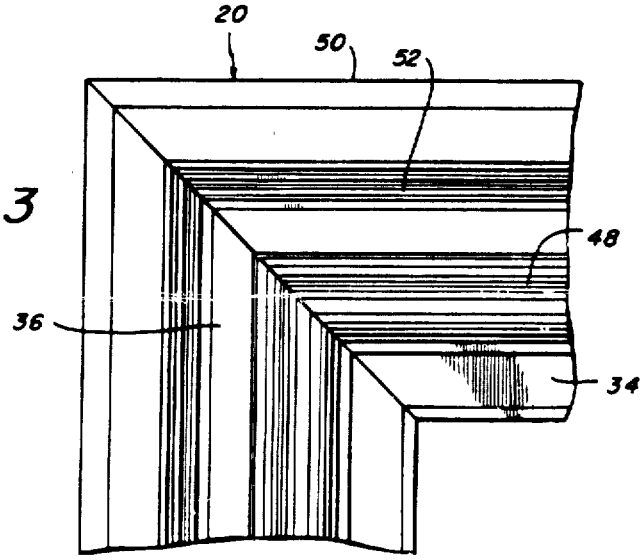
FIG. 3 is a plan view of a fragment of the skylight construction showing the corner seal.

Referring now to the drawings, FIGS. 1–3 show a first embodiment of the invention wherein the skylight is in the form of a domed skylight. The second embodiment is shown in FIGS. 4–6 and is a flat skylight construction.

In the first embodiment shown in FIGS. 1–3 the domed skylight construction spans an opening 10 which may be of square or rectangular shape and defined in part by upright walls 12. A finish material 14 may also be provided on the inside of the opening 10.

The skylight construction in the first embodiment includes a pair of domes 16 and 18 which are preferably acrylic thermoplastic domes, a curb frame 20 of a thermoplastic which is preferably polyvinylchloride (PVC), and a retainer 22. FIG. 2 is a cross-sectional view showing the curb frame. FIG. 3 shows a corner of the frame of FIG. 2 depicting the corner sealing arrangement.

About the wall 12 there may be provided a flashing or roofing felt strip 24 which extends along the outer surface of the wall and about the top thereof as depicted in FIG. 1. The curb frame 20 may be extruded in straight sections and is secured on the top of the wall 12 over the flashing strip 24. The curb frame 20 may be secured to the wall 12 by means of a number of nails 26 which extend through the flange 28 of the curb frame 20. In addition to the downwardly depending flange 28, the curb frame also includes a base wall 30 and a singular or plurality of upright walls defining trough 34 and providing support for domes 16 and 18. At the upright wall or walls there is the glazing seal gasket 48. A horizontal element 36 may also be provided. The bottom wall 30 may have nipples 38 to provide embeddment in mastic and to define the skylight well opening. As depicted in FIG. 1, a mastic 40 may be laid between the flashing strip 24 and the base wall 30. In the trough 34 there is preferably disposed a moisture absorbent material 42 which may be a cotton or other fibrous batten or the like. The trough 42 with the absorbent material is for receiving any condensation from the dome 18 and collecting this condensation. The curb frame is preferably also provided with openings 44 and 46 spaced therealong which are weep holes for any excess water permitting the water to be removed from the curb frame.

The extruded curb frame is constructed of a weatherable rigid thermoplastic material, such as a rigid PVC compound of a ASTM-D 1784-69 type 1334-C mady by B. F. Goodrich Company of Cleveland, Ohio. The specific gravity of this material is 1.46 or on that order. The material has a durometer D hardness of 82±3. The tensile strength is 6200 lbs. per sq. inch and the tensile modulus is 355,000 p.s.i. The IZOD impact at 32° F. is 1.781 lbs. per inch. The heat distortion at 264 p.s.i. is 163° F.

The curb frame, also includes a top cup-shaped gasket. 48 and a side edge gasket 50. Both of these gaksets integrally form with the curb frame but are of a weatherable flexible co-extrusion material such as GEON No. 83741 PVC compound. This compound has a specific gravity of 1.36 or thereabouts and has a durometer A hardness of 72±3. The tensile strength is on the order of 1550 p.s.i. and the tensile modulus is 675 p.s.i. The ultimate elongation is 310 and the brittleness temperature is −35° F.

The curb frame also includes an internally threaded recess 52 which receives bolt 54 for securing the retainer 22 to the curb frame 20. It is noted that the gasket 50 may be slightly deflected and seals against the wall 56 of the retainer. The top wall 58 of the retainer presses against the edges 17 and 19 of the respective domes 16 and 18. A compressible seal 60 is preferably sandwiched between the edges 17 and 19 and the edge 19 rests upon the cup-shaped gasket 48 which compresses to seal against the dome. A single dome 16 may be sufficient for certain applications, and in such case the seal 60 and dome 18 are not required.

FIG. 3 shows a corner of the construction wherein two straight sections of extruded curb frame are joined. These sections are joined to form the square or rectangular overall configuration of the curb frame. The joining is accomplished preferably by a heated platten welding technique which welds the section of curb frame at the same time also welding the gaskets 48 and 50.

FIGS. 4–6 show the second embodiment of the present invention in the form of a flat skylight construction which spans an opening 110 which may be of square or rectangular shape and defined in part by upright walls 12 and horizontal walls 14.

The skylight construction in the second embodiment includes a pair of glass plates 116 and 118, a curb frame 120, of a rigid thermoplastic such as polyvinylchloride (PVC), and a retainer 122. FIG. 5 is a cross-sectional view showing the design of the PVC curb frame. FIG. 6 shows a corner of the frame of FIG. 5 illustrating the corner sealing arrangement in accordance with the invention.

Roofing felt or other sealing layer 124 extends over the top surface of roof sheathing 14. The curb frame 120 is preferably extruded in straight sections and is secured on the top of the layer 124. The curb frame 120 may be secured to the roof sheathing 14 by means of a number of nails 126 which extend through the flange 128 of the curb frame 120. In addition to the outwardly extending flange 128, the curb frame also includes a base wall 130 and a singular wall or plurality of upright walls which hold the glazing 116 and 118, and threaded recess 152 above base wall 130. At the top of the upright wall or walls there is an integral co-extrusion glazing seal gasket 148. A horizontal element 136 may also be provided. The bottom wall 130 may have nipples 138 to provide embeddment in mastic and to define skylight well opening. As depicted in FIG. 4, a mastic 140 may be laid between the layer 124 and base wall 130. In the trough 134 there is preferably disposed a moisture absorbent material 142 which may be a cotton or other fibrous batten or the like. The trough 142 with the absorbent material is for receiving any condensation from the panel 118 in collecting this condensation. The curb frame is preferably also provided with openings 144 and 146 spaced therealong which are weep holes for any excess water permitting the water to be removed from the curb frame. The extruded curb frame may be constructed of a rigid thermoplastic material of the same type described in connection with the first embodiment.

The curb frame also includes a top cup-shaped gasket 148 and a side edge gasket 150. Both of these gaskets are integrally formed with the curbed frame but are of a flexible thermoplastic material which may be of the type described in connection with the first embodiment of this invention.

The curb frame also includes an internally threaded recess 152 which receives bolt 154 for securing the retainer 122 to the curb frame 120. The gasket 150 is slightly deflectable and provides a seal against the wall 156 of the retainer. The top wall 158 of the retainer presses against the edge 117 of the panel 116. A seal 160 is preferably sandwiched between the edges 117 and 119 when two glazing panels are required. However, in certain instances seal 160 and bottom glazing 119 can be eliminated. The edge 119 rests upon the cup-shaped gasket 148 which compresses to seal against the panel.

FIG. 6 shows a corner of the construction wherein two straight sections of extruded curb frame are joined. These sections are joined to form the square or rectangular overall configuration of the curb frame. The joining is accomplished preferably by a heat platten welding technique which welds the section of curb frame at the same time also welding the gaskets 148 and 150.

One of the important features of the present invention is the special construction of the curb frame of this invention which is preferably of a thermoplastic material such as polyvinylchloride. The construction of the curb frame may also be of any other type of thermoplastic material. The majority of the curb frame is constructed of a plastic that is substantially rigid to provide the basic support. On the other hand, the gaskets, such as gaskets 48 and 50 are of a quite flexible material. For example, FIGS. 1 and 2 show the different positions of the gasket 48 both in its normal position in FIG. 2 and in its compressed position in FIG. 1.

The domed glazing described in conjunction with thermoplastic frame 28 may also be used on frame 120, and the flat glazing described in conjunction with thermoplastic frame 120 may also be used on frame 28.

What is claimed is:

1. A skylight construction of an opening in a building comprising;

a curb frame extending about the opening and having means for receiving a means for securing the frame in place about the opening, translucent or transparent means covering the opening and extending at its edges to the curb frame, means for retaining the covering means on the curb frame, said curb frame being constructed of a rigid thermoplastic material having co-extruded and integral therewith at least one gasket of flexible thermoplastic material for providing a leak-proof seal between the curb frame and covering means, said rigid thermoplastic material forming the curb frame and said co-extruded flexible thermoplastic material being commonly heat welded to join the curb frame mitres and also simultaneously weld the gaskets at the curb frame mitres to provide a continuous seal about the entire curb frame.

2. A skylight construction as set forth in claim 1 wherein said rigid thermoplastic is a rigid PVC and said flexible thermoplastic is a flexible PVC.

3. A skylight construction as set forth in claim 2 wherein the rigid PVC has a hardness which is within the shore "D" hardness scale and the flexible PVC has a hardness which is within the shore "A" hardness scale.

4. A skylight construction as set forth in claim 1 wherein said covering means includes at least one plate means.

5. A skylight construction as set forth in claim 1 wherein said covering means includes at least one acrylic dome.

6. A skylight construction as set forth in claim 1 wherein both said curb frame and gasket are heat sealed at the corners of the construction.

7. A skylight construction as set forth in claim 1 wherein said gasket is cup-shaped.

8. A skylight construction as set forth in claim 1 wherein said curb frame has means on the inner side thereof defining a condensation gutter.

9. A skylight construction as set forth in claim 1 including a second gasket that is flexible, integral and co-extruded with the curb frame and contacting the retaining means to form a seal therewith.

10. A skylight construction as set forth in claim 1 wherein said retaining means includes a retainer having one side contacting the edge of the covering means and another side extending over the curb frame.

11. A skylight construction as set forth in claim 10 including securing means for securing the retainer to the curb frame sandwiching the edge of the covering means between the curb frame and the one side of the retainer.

12. A skylight construction for an opening in a building comprising;

a curb frame extending about the opening and having means for receiving a means for securing the frame in place about the opening, translucent or transparent means covering the opening and extending at its edges to the curb frame, means for retaining the covering means on the curb frame, said curb frame being constructed predominantly of a rigid thermoplastic material having linearly extending sides defining a substantially flat top wall having a gasket co-extruded and integral therewith constructed also a thermoplastic material but one that is flexible, said gasket having a non-compressed position wherein the gasket extends its maximum distance from the top wall, and a compressed position, being compressed in a direction normal to the top wall by the engagement with the covering means, wherein the gasket is compressed to seal between the curb frame and covering means, said curb frame having inner and outer sides and defined at least in part by a plurality of walls including said top wall which together define a hollow duct substantially closed except for weep holes permitting communication between the inner and outer sides of the curb frame, said hollow duct overlying a support wall for the curb frame and underlying said gasket and covering means.

13. A skylight construction as set forth in claim 12 wherein said curb frame has means in its top wall defining a recess for receiving a securing means forming a part of the retaining means for the covering means.

14. A skylight construction as set forth in claim 13 wherein the securing means include a securing bolty passing through the retainer and into the recess which is threaded to receive the bolt.

15. A skylight construction as set forth in claim 14 including parallel inner and outer side walls of the frame side each having at least one weep hole therein.

16. A skylight construction as set forth in claim 12 wherein said gasket has substantially one connection point to the frame and is cup-shaped having at least a partially annular edge contacting the covering means.

17. A skylight construction as set forth in claim 12 wherein said gasket has an area of connection to the frame that is smaller than the sealing area of the gasket to the covering means.

18. A skylight construction as set foth in claim 12 wherein said plurality of walls includes inner and outer vertical walls with the weep holes in these respective inner and outer vertical walls.

19. A skylight construction for an opening in a building comprising;

a curb frame extending about the opening and having means for receiving a means for securing the frame in place about the opening, translucent or transparent means covering the opening and extending at its edges to the curb frame, means for retaining the covering means on the curb frame, thermoplastic material having linearly extending sides defining a substantially flat wall having a gasket co-extruded and integral therewith constructed also a thermoplastic material but one that is flexible, said gasket having a non-compressed position wherein the gasket extends its maximum distance from the top wall, and a compressed position, being compressed in a direction normal to the top wall wherein the gasket is compressed to seal between the curb frame and covering means, said gasket having a fixed connection base for connection to the curb frame with the flexible portion of the gasket extending from the base and flexible and compressible in said normal direction, said rigid thermoplastic material forming the curb frame and said co-extruded flexible thermoplastic material being commonly heat welded to join the curb frame mitres and also simultaneously weld the gaskets at the curb frame mitres to provide a continuous seal about the entire curb frame.

20. A skylight construction as set forth in claim 19 wherein said gasket is elongated to extend along each side of the curb frame being secured along a single base edge wherein the gasket is held fixedly.

21. A skylight construction as set forth in claim 20 wherein the gasket is cup-shaped in cross-section having opposite extending linear edges that flex to seal.

22. A skylight construction as set forth in claim 20 wherein said gasket has an area of connection to the frame that is smaller than the sealing area of the gasket to the covering means.

23. A skylight construction as set forth in claim 19 wherein the gasket extends around all sides of the curb frame.

24. A skylight construction as set forth in claim 19 wherein said top wall is disposed substantially horizontally and the flexible portion of the gasket overlies the top wall and is compressed by the weight of the overlying covering means toward the top wall.

25. A skylight construction as set forth in claim 24 wherein said gasket is cupped with opposite extending linear flexible edges that overlie said top wall and that are compressed theretowards.

26. A skylight construction for an opening in a building comprising;

a curb frame extending about the opening and having a means for receiving a means for securing the frame in place about the opening, translucent or transparent means covering the opening and extending at its edges to the curb frame, means for retaining the covering means on the curb frame, said curb frame being constructed predominantly of a rigid thermoplastic material having linearly extending sides defining a substantially flat top wall having a gasket co-extruded and integral therewith constructed also a thermoplastic material but one that is flexible;

said gasket having a non-compressed position wherein the gasket extends its maximum distance from the top wall, and a compressed position, being compressed in a direction normal to the top wall by the engagement with the covering means, wherein the gasket is compressed to seal between the curb frame and covering means, said curb frame having inner and outer sides and defined at least in part by a plurality of walls including said top wall which together define a hollow duct substantially closed, said hollow duct overlying a support wall for the curb frame and underlying said gasket and covering means, said hollow duct providing a dead air space to provide increased resistance to thermal conductivity.

*27. A skylight construction as set forth in claim 26 wherein said gasket has substantially one connection point to the curb frame and is cup-shaped having an edge contacting the covering means.*

*28. A skylight construction as set forth in claim 26 wherein said rigid thermoplastic material forming the curb frame and said co-extruded flexible thermoplastic material being commonly sealed to join the curb frame mitres and also simultaneously secure the gaskets at the curb frame mitres to provide a continuous seal about the entire curb frame.*

*29. A skylight construction as set forth in claim 26 wherein said curb frame has means on the inner side thereof defining a condensation gutter.*

*30. A skylight construction as set forth in claim 29 wherein said condensation gutter is formed in part by a wall forming said hollow duct.*

*31. A skylight construction as set forth in claim 26 wherein said rigid thermoplastic is a rigid PVC and said flexible thermoplastic is a flexible PVC.*

*32. A skylight construction of an opening in a building comprising;*

*a curb frame extending about the opening and having means for receiving a means for securing the frame in place about the opening,*

*translucent or transparent means covering the opening and extending at its edges to the curb frame,*

*means for retaining the covering means on the curb frame,*

*said curb frame being constructed of a rigid thermoplastic material having co-extruded and integral therewith a least one gasket of flexible thermoplastic material disposed between the curb frame and covering means,*

*said rigid thermoplastic material forming the curb frame and said co-extruded flexible thermoplastic material being commonly sealed to join the curb frame mitres and also simultaneously secure the gasket at the curb frame mitres to provide a continuous seal about the entire curb frame.*

*33. A skylight construction as set forth in claim 32 wherein said curb frame has a plurality of walls including a top wall for supporting said gasket.*

*34. A skylight construction as set forth in claim 33 wherein said plurality of walls define a hollow duct that is substantially closed.*

*35. A skylight construction as set forth in claim 34 wherein said hollow duct overlies a support wall for the curb frame and underlies said gasket and covering means.*

*36. A skylight construction as set forth in claim 32 wherein said rigid thermoplastic is a rigid PVC and said flexible thermoplastic is a flexible PVC.*

*37. A skylight construction as set forth in claim 32 wherein both said curb frame and gasket are heat sealed at the mitres.*

* * * * *